3,252,011

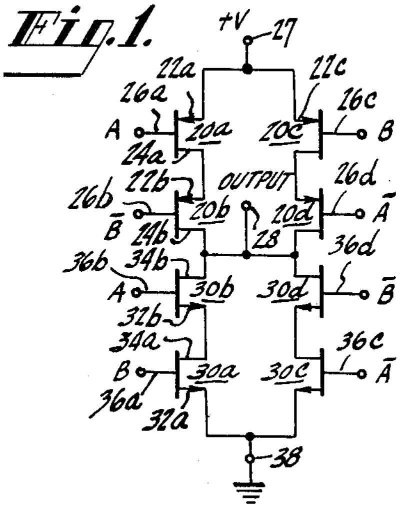
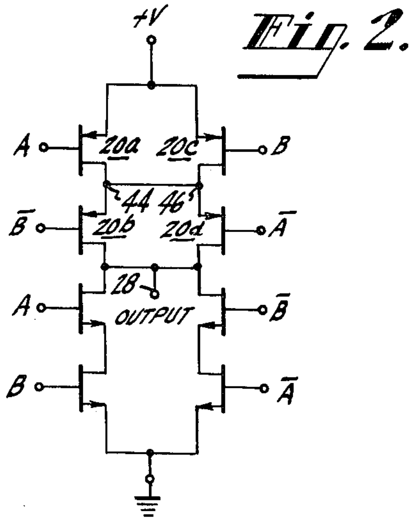
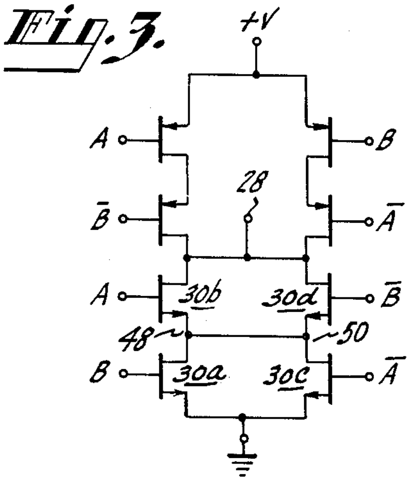
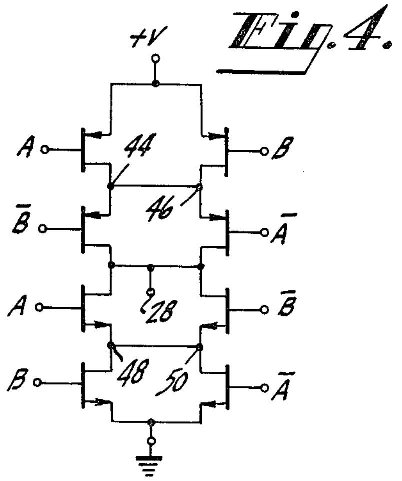
EXCLUSIVE OR
FOR +V VOLT SIGNALS
| A | B | OUT |
|---|---|---|
| 0 | 0 | 0 |
| +V | 0 | +V |
| 0 | +V | +V |
| +V | +V | 0 |
OUTPUT = ĀB + AB̄
FIG. 5.
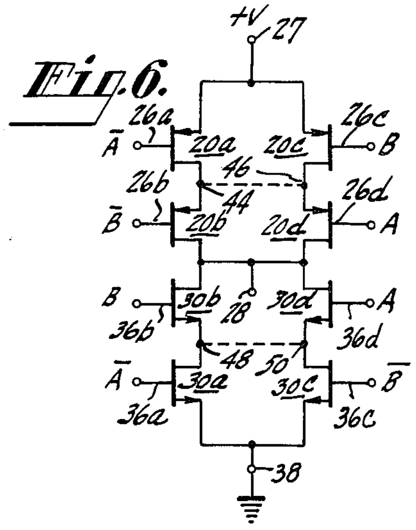
EXCLUSIVE OR
FOR 0 VOLT SIGNALS
| A | B | OUT |
|---|---|---|
| 0 | 0 | +V |
| +V | 0 | 0 |
| 0 | +V | 0 |
| +V | +V | +V |
OUTPUT = $\overline{\bar{A}B + A\bar{B}}$
FIG. 7.
INVENTOR.
BORYS ZUK
BY
John V. Regan
Attorney

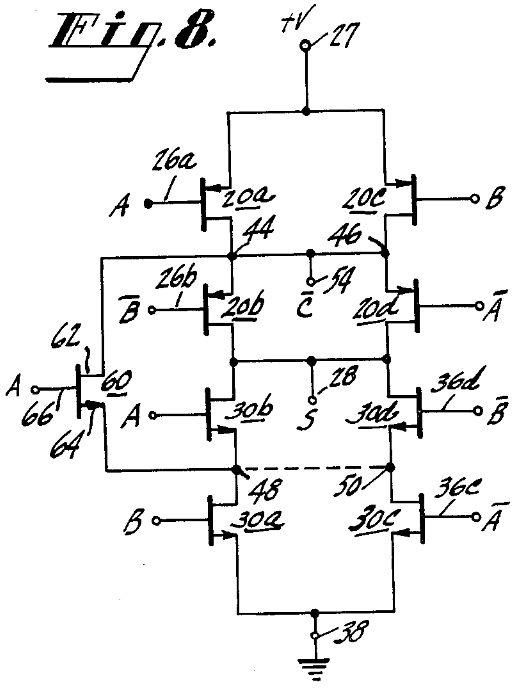
FIG. 8.
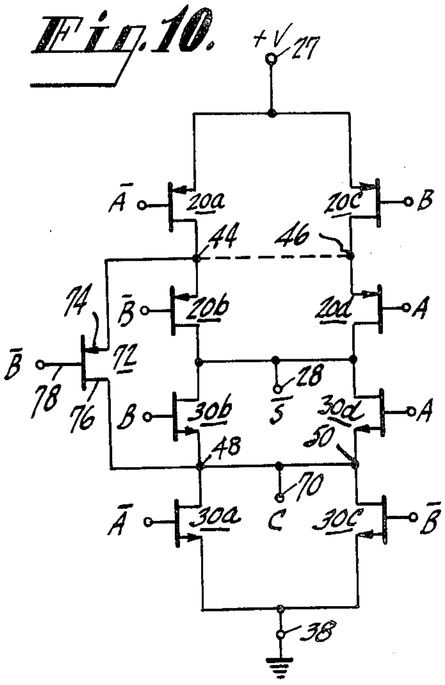
FIG. 10.
| A | B | S | $\bar{C}$ |
|---|---|---|---|
| 0 | 0 | 0 | +V |
| 0 | +V | +V | +V |
| +V | 0 | +V | +V |
| +V | +V | 0 | 0 |
$$S = \bar{A}B + A\bar{B}$$
$$\bar{C} = \overline{AB}$$
FIG. 9.
| A | B | $\bar{S}$ | C |
|---|---|---|---|
| 0 | 0 | +V | 0 |
| +V | 0 | 0 | 0 |
| 0 | +V | 0 | 0 |
| +V | +V | +V | +V |
$$\bar{S} = \overline{\bar{A}B + A\bar{B}}$$
$$C = AB$$
FIG. 11.
INVENTOR.
BORYS ZUK
BY John V. Regan
Attorney 3,252,011
Patented May 17, 1966

LOGIC CIRCUIT EMPLOYING TRANSISTOR MEANS WHEREBY STEADY STATE POWER DISSIPATION IS MINIMIZED

Borys Zuk, Somerville, N.J., assignor to Radio Corporation of America, a corporation of Delaware Filed Mar. 16, 1964, Ser. No. 352,089
12 Claims. (Cl. 307—88.5)

This invention relates to logic circuits and, in particular, to EXCLUSIVE OR logic circuits and to logic arrangements which make use of the EXCLUSIVE OR function.

An EXCLUSIVE OR circuit may be defined as a circuit having an output of prescribed value when any one and only one of its several inputs is in a specified state. Insofar as binary information handling systems are concerned, the output of an EXCLUSIVE OR circuit is a binary "1" when one, and only one, input is a binary "1." Such circuits find use in computers and controls and are useful in comparators and half adders, by way of example. In view of the growing emphasis on integrated electronics, it is desirable to provide improved circuitry of the type described that has very low power dissipation in the steady state condition.

One object of the present invention is to provide a new and improved EXCLUSIVE OR circuit.

Another object of this invention is to provide a new and improved half adder circuit.

Still another object of this invention is to provide circuits of the type described in which, ideally, the only steady state power dissipation is due to leakage current in the active devices.

A further object of this invention is to provide improved circuits of the type described which may employ insulated-gate field-effect transistors connected in a push-pull logic arrangement.

According to the invention, a number of semiconductor amplifier means of one conductivity type have their conduction paths connected to provide first and second circuit paths between an output terminal and a first point of operating potential. A number of semiconductor amplifier means of the opposite conductivity type have their conduction paths connected to provide third and fourth circuit paths between the output terminal and a second point of different operating potential. Each circuit path has two control electrodes associated therewith to control the conductivity of the path. Signals A and B, representing two different quantities, and the complements $\overline{A}$ and $\overline{B}$ thereof are each applied to a different one of the control electrodes associated with the first and second circuit paths, and are each applied to a different one of the control electrodes associated with the third and fourth circuit paths.

In the accompanying drawing, like reference characters denote like components, and:

FIGURES 1–4 are schematic diagrams of EXCLUSIVE OR circuits for relatively positive input signals, and FIGURE 5 is a "truth" table for these circuits;

FIGURE 6 is a schematic diagram of an EXCLUSIVE OR circuit for relatively negative input signals, and FIGURE 7 is a "truth" table for the circuit;

FIGURE 8 is a schematic diagram of a half adder circuit providing SUM and CARRY-NOT outputs;

FIGURE 9 is a "truth" table for the half adder of FIGURE 8;

FIGURE 10 is a schematic diagram of a half adder circuit providing SUM-NOT and CARRY outputs; and FIGURE 11 is a "truth" table for the half-adder of FIGURE 10.

Heat generated in electrical circuits usually is undesirable because of its aging effect on circuit components, its effect in changing the operating parameters and electrical characteristics of some components, and the resulting need and expense of providing cooling means in some cases. Moreover, the heat generated represents a power loss. The problem of heat generation is especially significant in integrated structures because of the small physical size of the circuitry and the close spacing of adjacent circuits. It is desirable, therefore, that either the circuits be arranged or means be devised to reduce the generation of heat and dissipation of power as much as possible.

An insulated-gate field-effect transistor has characteristics which make such a device particularly suitable for use in integrated circuitry. Such a transistor may be defined generally as a majority carrier field-effect device which includes a semiconductor layer or wafer, with source (input) and drain (output) regions that are spaced from each other and that are contiguous to the semiconductor. The semiconductor furnishes a conduction path for current flow between the source and drain. A gate (control) electrode is separated by an insulating film from a portion of the semiconductor which lies between the source and drain, and controls the conductivity, or resistance, of the conduction path between source and drain. Since the gate is insulated from the semiconductor, it does not draw any current, or at least it draws no appreciable current. For this reason the gate electrode of one device may be connected directly to the drain electrode of another device, and there is little or no current flow through, or power dissipated in, the connection.

Two known types of insulated-gate field-effect transistors are the thin-film transistor (TFT) and the metal-oxide semiconductor (MOS). Some of the physical and operating characteristics of a thin-film transistor are described in an article, by P. K. Weimer, entitled, "The TFT–A New Thin-Film Transistor," appearing at pages 1462–1469 of the June, 1962 issue of the Proceedings of the IRE. The MOS transistor is described in an article entitled "The Silicon Insulated-Gate Field-Effect Transistor," by S. R. Hofstein and F. P. Heiman, appearing at pages 1190–1202 of the September, 1963 issue of the Proceedings of the IEEE.

Suffice it to say here that such transistors may be of either the enhancement type or the depletion type. The enhancement type unit is of particular interest in the present application. In an enhancement type unit, only a small leakage current flows between source and drain when the voltage at the gate and source have the same value. The transistor is biased "on" when the gate voltage differs from the source voltage in a specified polarity direction. The conductivity of the conduction path between source and drain increases with an increasing difference in potential between gate and source.

A unit may be either a P-type or an N-type, depending upon the conductivity type material of the semiconductor. A P-type unit may be defined as one in which the majority charge carriers are holes; in the N-type unit, the majority charge carriers are electrons. According to this definition, a P-type enhancement unit is one in which current may flow between source and drain, the source being positive with respect to the drain, when the gate voltage is negative relative to the source voltage; for an N-type enhancement unit, the gate is biased positive relative to the source for conduction between a source negative with respect to the drain.

Because of the especially desirable characteristics of insulated-gate field-effect transistors in circuits described herein, these circuits are illustrated as employing such transistors.

A first EXCLUSIVE OR circuit embodying the invention is illustrated in schematic form in FIGURE 1, and comprises first, second, third and fourth insulated-gate field-effect transistors 20a–20d of one conductivity type, shown as P-type, by the internally directed arrow head on the source electrodes, and fifth, sixth, seventh, and eighth transistors 30*a*–30*d* of the opposite conductivity type, shown as being N-type by the internally directed arrow heads on the source electrodes. First transistor 20*a* has its source, or input, electrode 22*a* connected directly to a terminal 27 which receives an operating potential of +V volts, and has its drain, or output, electrode 24*a* directly connected to the source electrode 22*b* of second transistor 20*b*. A common output terminal 28 is connected to the drain electrode 24*b* of second transistor 20*b*. By these connections, there is provided a first circuit path between the +V volt source and the output terminal 28, which circuit path includes the series connected conduction paths of the first and second transistors 20*a*, 20*b*. The conductivity of this circuit path is controlled by the voltages applied at the gate, or control, electrodes 26*a*, 26*b* associated with the transistors 20*a*, 20*b*, respectively.

Third and fourth transistors 20*c*, 20*d* are connected in a similar manner to provide a second circuit path between the +V volt source and the output terminal 28. The latter circuit path is controlled by the voltages applied at the gate electrodes 26*c* and 26*d* associated with the third and fourth transistors 20*c*, 20*d*. It will be apparent from a later discussion that very little current actually flows over the circuit paths in the steady state of this circuit, and that the conductivity or resistance of the paths are controlled by the voltages applied at the various gate electrodes.

Fifth transistor 30*a*, which is an N-type unit, has its source electrode 32*a* connected to a terminal 38, which is at ground potential, and has its drain electrode 34*a* directly connected to the source electrode 32*b* of sixth transistor 30*b*. The drain electrode 34*b* of the latter transistor is directly connected to the output terminal 28, whereby there is provided a circuit path between circuit ground and the output terminal 28, the circuit path including the series connected conduction paths of the fifth and sixth transistors 30*a*, 30*b*. The conductivity of the circuit path is controlled by the voltages applied at the gate electrodes 36*a*, 36*b* of the transistors 30*a*, 30*b*, respectively.

Seventh and eighth N-type transistors 30*c*, 30*d* are connected in a manner similar to that of the fifth and sixth transistors to provide a second circuit path between circuit ground and the output terminal 28. The conductivity of this path is controlled by the voltages applied at the gate electrodes 36*c*, 36*d* of the transistors 30*c*, 30*d*, respectively.

First input signals, representing a quantity A, are applied at the gate electrodes 26*a* and 36*b* of the first and sixth transistors 20*a*, 30*b*. The complements of these signals, designated $\overline{A}$, are applied at the gate electrodes 26*d* and 36*c* of the fourth and seventh transistors 20*d*, 30*c*. Second input signals, representing a quanity B, are applied at the gate electrodes 26*c* and 36*a* of the third and fifth transistors 20*c*, 30*a*, and the complements of these signals, designated $\overline{B}$, are applied at the gate electrodes 26*b* and 36*d* of the second and eighth transistors 20*b*, 30*d*.

All of the input signals are bivalued in the sense that a signal may have either a first value or a second value. When one of the input signals has a first value, the complement of that signal has the second value, and vice versa. The signals are chosen to have a value of either +V volts or zero volts, the values of the potentials at the terminals 27 and 38. When the signals are applied as shown in FIGURE 1, the operation of the circuit is defined by the "truth" table of FIGURE 5. As shown in the table, the voltage at output terminal 28 is zero volts whenever the signals A and B have the same value, either zero volts or +V volts, and is +V volts when one and only one of the input signals A, B is +V volts. It will be recognized from the truth table that the FIGURE 1 circuit performs the EXCLUSIVE OR logic function for signals of +V volts. In a binary system where a binary "1" is represented by a signal or level of +V volts and a binary "0" is represented by a signal or level of zero volts, the FIGURE 1 circuit performs the EXCLUSIVE OR function. On the other hand, if a binary "1" is a signal or level of zero volts and a binary "0" is represented by a signal or level of +V volts, the FIGURE 1 circuit operates to perform the EXCLUSIVE OR-NOT function; that is to say, the voltage at the output terminal 28 is the complement of the EXCLUSIVE OR function.

Consider now the manner in which the FIGURE 1 circuit operates. Assume that the A and B inputs are both zero volts. This means that the $\overline{A}$ and $\overline{B}$ inputs are +V volts. It will be recalled that, for a P-type transistor of the enhancement type, there is a very high impedance between source and drain when the source and gate voltages have the same value, and that the gate voltage must be negative relative to the source voltage in order for the transistor to be "on." For an N-type enhancement unit, the gate voltage must be positive relative to the source voltage for the transistor to be "on."

With the A and B inputs at zero volts, second and fourth transistors 20*b*, 20*d* and fifth and sixth transistors 30*a*, 30*b* are biased in a very high impedance condition, on the order of a megohm or more, for example. The circuit paths which include the aforementioned transistors may be considered to be open-circuited at this time. Seventh and eighth transistors 30*c*, 30*d* have voltages of +V volts applied at their gate electrodes 36*a*, 36*d*, respectively, whereby these transistors are in a state of high conductivity, on the order of a kilohm, for example. The circuit path which includes these transistors provides a relatively low impedance path between circuit ground and the output terminal 28, whereby the voltage at output terminal 28 is close to ground potential.

As mentioned previously, little or no current flows between the gate electrode of a transistor and its source and drain electrodes in the steady state because of the insulated film separating the gate electrode from the semiconductor. Accordingly, essentially no current flows in the gate circuits of the seventh and eighth transistors 30*c*, 30*d*. Also, no current flows from the output terminal 28 to the gate electrodes of any other insulated-gate field-effect transistors which may be connected as loads at the output terminal. It may be seen, therefore, that since all of the circuit paths except the one including the transistors 30*c* and 30*d* are "open circuited," practically no current flows through the seventh and eighth transistors 30*c*, 30*d*, there being no complete path through these transistors between circuit ground and the +V volt source. From a practical standpoint, the only current which flows is due to leakage current in the "off" transistors and there is, therefore, very little power dissipation. With very small leakages, an ideal "zero" power dissipation may be approached.

Consider now the situation when the A input signal is at +V volts and the B input signal is at zero volts. The $\overline{A}$ signal then is zero volts and the $\overline{B}$ signal is +V volts. First transistor 20*a* is biased in the "off" condition since its gate voltage is the same as its source voltage. The same is true for second transistor 20*b*, fifth transistor 30*a* and seventh transistor 30*c*, whereby the circuit paths which include these transistors have very high impedances and may be considered to be open-circuited. However, the voltages at the gate electrodes 26*c* and 26*d* are both zero volts and third and fourth transistors 20*c*, 20*d* are biased in the "on" condition of high conductivity. There is, therefore, a low impedance path through the latter transistors between the +V volt source and the output terminal 28, and the voltage at output terminal 28 is close to +V volts.

By a similar analysis, it may be shown that first and second transistors 20*a*, 20*b* are both in the low impedance condition, and provide a low impedance path between the +V volt source and output terminal 28 when the A input is at zero volts and the B input is at +V volts. Fifth and sixth transistors 30*a*, 30*b* are in the low impedance condition when both the A and B inputs are at +V volts, and there is then a low impedance path between circuit ground and the output terminal 28.

Since only one of the circuit paths between the output terminal 28 and one of the points 27 or 38 of operating potential, +V volts or zero volts, is in a low impedance condition for any steady state condition of the circuit, there is never a low impedance path between circuit ground and the +V volt source in the steady state. Accordingly, the circuit has a very low steady state power dissipation. Whatever power is dissipated is due to the leakage currents of the "off" transistors. During a switching transient, circuit parasitic capacitances are charged or discharged through some or all of the transistors, giving rise to some power dissipation. With fast transistors, especially those having a turn-on threshold, an "on" transistor can turn "off" sooner than an "off" transistor turns "on," whereby there is no low impedance path between ground and the +V volt source during the transient period.

The circuits illustrated in FIGURES 2, 3 and 4 are variations, for reasons described later, of the FIGURE 1 circuit. The FIGURE 2 circuit differs structurally from the FIGURE 1 circuit in that there is a direct connection between a point 44 on the circuit path between first and second transistors 20*a*, 20*b* and a point 46 on the series circuit path between third and fourth transistors 20*c*, 20*d*. This connection has no effect on the circuit's operation for the reason that when first transistor 20*a* is in the "on" condition, fourth transistor 20*d* is in the "off" condition because of the different voltage values applied concurrently at their gate electrodes 26*a*, 26*d*. Likewise, when second transistor 20*b* is in the "on" condition, third transistor 20*c* is in the "off" condition, and vice versa, because of the different voltages applied concurrently at their gate electrodes 26*b* and 26*c*. The logical operation performed by the FIGURE 2 circuit is the same as that performed by the FIGURE 1 circuit, and the "truth" table of FIGURE 5 applies to the FIGURE 2 circuit arrangement.

The FIGURE 3 circuit differs structurally from the FIGURE 1 circuit in that there is a direct current connection between a point 48 on the circuit path between fifth and sixth transistors 30*a*, 30*b* and a point 50 on the series of circuit path between seventh and eighth transistors 30*c*, 30*d*. This connection also has no effect on the circuit's operation. The FIGURE 4 circuit is similar to the FIGURE 1 circuit, but includes the two additional connections separately incorporated in the FIGURE 2 and FIGURE 3 circuit arrangements.

The additional connections in FIGURES 2, 3 and 4 are of importance in some circuit applications, a few of which will be described hereinafter. Also, these connections may be of importance depending upon the manner in which the circuit is fabricated in integrated form. Although all of the eight transistors illustrated in the various FIGURES 1 through 4 are shown schematically as being individual units, it is possible to fabricate a pair of these transistors as a single unit having only one source and one drain. By way of example, first and second transistors 20*a*, 20*b* (FIGURES 1 or 3) may be fabricated as a single unit having one source, one drain, and two insulated-gate electrodes separated from each other and spaced at different points along the conduction path of the semiconductor between source and drain. One example of such an integrated structure is shown at the left in FIGURE 15 of the aforementioned article by P. K. Weimer. Transistor pairs 20*c* and 20*d*, 30*a* and 30*b*, and 30*c* and 30*d* (FIGURE 1) could be similarly fabricated.

As another alternative, the first and third transistors 20*a*, 20*c* (FIGURES 2 and 4) may be fabricated as a single unit having one source and one drain, but having two conduction paths between the source and drain, there being a separate gate electrode for each of the conduction paths. One example of such a fabrication is illustrated to the right in FIGURE 15 of the Weimer article.

Either the integrated unit which has a single conduction path and two control electrodes, or the unit having two conduction paths and separate gate electrodes for each path may be considered to be a "transistor means (or a semiconductor means) having an input electrode, an output electrode, at least one conduction path between the input and output electrodes, and two control electrodes."

FIGURE 6 is another embodiment of an EXCLUSIVE OR gate embodying the present invention. This arrangement is structurally the same as the circuit of FIGURE 1, and differs in that the input signals are applied at different gate electrodes from those shown in FIGURE 1. For example, input signals A are applied at the control electrodes 26*d* and 36*d* of the fourth and eight transistors 20*d*, 30*d*. Input signals A are applied at the gate electrodes 26*a*, 36*a* of the first and fifth transistors 20*a*, 30*a*. Input signals B are applied at the gate electrodes 26*c* and 36*b* of the third and sixth transistors 20*c*, 30*b*; and input signals $\overline{B}$ are applied at the gate electrodes 26*c*, 36*c* of the second and seventh transistors 20*b*, 30*c*.

Because of the different manner in which the input signals are applied, the FIGURE 6 circuit arrangement performs a different logic function from that of the FIGURE 1 circuit arrangement. FIGURE 7 is a "truth" table for the FIGURE 6 arrangement. It may be seen from this table that the voltage at output terminal 28 is +V volts whenever the A and B input signals or levels have the same value, and is zero volts only when one of the input signals A or B is +V volts and the other is zero volts. It will be recognized from this truth table that the circuit of FIGURE 6 performs the EXCLUSIVE OR logic function for relatively negative (zero volt) input signals, and performs the EXCLUSIVE OR-NOT logic function for relatively positive input signals (+V volts).

As in the case of any of the arrangements of FIGURES 1 through 4, there is essentially no current flow through any of the transistors in any steady state condition, there being leakage current flow only, whereby the circuit has a very low power dissipation in the steady state. Moreover, direct current connections may be made between the points 44 and 46 and/or the points 48 and 50 on the circuit paths without affecting the operation of the circuit.

FIGURE 8 is a schematic diagram of a half adder circuit embodying the invention. A half adder circuit may be defined as one having first and second output terminals, characterized in that an output is derived at the first output terminal which is related to the SUM function and the output at the second terminal is related to the CARRY function when signals representing two quantities to be added are applied as inputs to the circuit. In the case of the FIGURE 8 arrangement, a SUM output "S" is derived at output terminal 28 and a CARRY-NOT, or $\overline{\text{CARRY}}$ output "$\overline{\text{C}}$," is derived at a second output terminal 54. The output terminal 54 is connected to the connection between points 44 and 46 on the two circuit paths in the top half of the circuit drawing.

The circuit is otherwise the same structurally as that illustrated in FIGURE 2, except that an additional N-type transistor 60 is added. Transistor 60 has its drain electrode 62 connected to the point 44 and has its source electrode 64 connected to the point 48 on the circuit path between fifth and sixth transistors 30*a*, 30*b*. The point 48 may be directly joined to the point 50 on the other circuit path, if desired, without any effect on the operation of the circuit. The gate electrode 66 of transistor 60 is connected to receive the input signal A.

A "truth" table for the half adder circuit is given in FIGURE 9. It will be noted that the SUM outputs listed in the table are identical to the outputs listed in the FIGURE 5 "truth" table for the same combinations of inputs, because the EXCLUSIVE OR portion of the circuit arrangement is similar to that of the FIGURE 1 arrangement. It will also be noted that the $\overline{C}$ output is zero volts only when both of the A and B inputs are +V volts, where the CARRY-NOT function is performed.

Consider now the operation of the FIGURE 8 logic arrangement, and assume that both of the inputs A and B are at zero volts. Complement signals $\overline{A}$ and $\overline{B}$ then each have a value of +V volts. First and third transistors 20*a*, 20*c* are in the low impedance condition, whereby the voltage at output terminal 54 has a value close to +V volts. Second and fourth transistors 20*b*, 20*d*, however, are in the high impedance state because the voltages at their control electrodes 26*b*, 26*d* are the same as the voltages at their input electrodes. Accordingly, transistors 20*b*, 20*d* essentially provide open-circuits between terminals 44, 46 and output terminals 28.

Fifth and sixth transistors 30*a*, 30*b* also are in the "off" condition. However, seventh and eighth transistors 30*c*, 30*d* each receive voltages of +V volts at their control electrodes 36*c*, 36*d*, respectively, whereby these transistors both are in the "on" condition and have a high conductivity. The voltage at output terminal 28 is close to ground potential because of the low impedance path provided by seventh and eighth transistors 30*c*, 30*d*. Additional transistor 60 is in the "off" condition because the voltage at its control electrode 60 is the same as the voltage at its input electrode 64, and is less than the voltage at its output electrode 62.

Assume now that input signal A has a value of zero volts and B has a value of +V volts. The zero volts applied at the control electrode 26*a* of first transistor 20*a* biases the transistor in the "on" condition and provides a relatively low impedance path between the output terminal 54 and the +V volt source. Accordingly, the voltage at output terminal 54 is close to +V volts. second transistor 20*b* also has a voltage of zero volts applied at its gate electrode 26*b*. This transistor is in the "on" condition and provides a low impedance path between output terminal 28 and junction 44. First and second transistors 20*a*, 20*b* provide a low impedance circuit path between output terminal 28 and the +V voltage source, whereby the voltage at output terminal 28 is close to +V volts. Both the third and fourth transistors 20*c*, 20*d* and the sixth and seventh transistors 30*b*, 30*d* are in the high impedance "off" condition at this time.

When the input signal A has a value of +V volts and input signal B has a value of zero volts, third and fourth transistors 20*c*, 20*d* are biased in the "on" condition and provide a low impedance path between output terminal 28 (and output terminal 54) and the +V volt source. Accordingly, the voltages at output terminals 28 and 54 are close to +V volts. All of the other circuit paths include at least one transistor in the "off" condition at this time.

When both the A and B input signals have values of +V volts, fifth and sixth transistors 30*a*, 30*b* are "on" and provide a low impedance path between circuit ground and the SUM output terminal 28. The voltage at output terminal 28 then is close to ground potential. Additional transistor 60 has zero volts applied at its input electrode 64 and has +V volts applied at its control electrode 66. This transistor 60 is biased in the full on condition and provides a low impedance path between terminals 48 and 44, whereby the voltage at the output terminal 54 is close to ground potential.

In the steady state condition, only one of the circuit paths has a low impedance. The other three circuit paths are essentially open-circuited for practical purposes. Since there is never a low impedance path between circuit ground and the +V volt source, there is very little current flow in any of the transistors in the steady state condition and, consequently, very little power dissipation. The only current which flows in the steady state is due to leakage currents in the "off" transistors.

The half adder circuit of FIGURE 10 includes the EXCLUSIVE OR-NOT circuit of FIGURE 6. A direct connection is made between the point 48 on the circuit path between fifth and sixth transistors 30*a*, 30*b* and the point 50 on the circuit path between seventh and eighth transistors 30*c*, 30*d*. An output terminal 70 is connected in common to the points 48, 50, and the CARRY output is derived at this terminal 70. A similar connection may be made, if desired, between the points 44 and 46. An additional P-type transistor 72 has its input electrode 74 connected at the junction 44 and has its output electrode 76 connected directly to the junction 48. The signal $\overline{B}$ is applied at the control electrode 78 of the transistor.

A "truth" table for the FIGURE 10 arrangement is given in FIGURE 11. It will be recognized from this table that the output $\overline{S}$, which is derived at output terminal 28, is the SUM-NOT function. The output C, which is derived at output terminal 70 will be recognized as the CARRY function.

Consider now the operation of the FIGURE 10 circuit, and assume that both of the input signals A and B are at zero volts. The complement signals $\overline{A}$ and $\overline{B}$ then have values of +V volts. Third and fourth transistors 20*c*, 20*d* are biased in the "on" condition and provide a low impedance circuit path between output terminal 28 and the +V volt source, whereby the voltage at output terminal 28 is close to +V volts. Fifth and seventh transistors 30*a*, 30*c* also are biased in the "on" condition and provide low impedance paths between circuit ground and the CARRY output terminal 70. All of the other transistors are in the "off" condition, whereby there is no low impedance path between circuit ground and the +V volt source.

Assume now that signal A has a value of +V volts and signal B has a value of zero volts. Seventh and eighth transistors 30*c*, 30*d* are biased in the "on" condition and provide a low impedance circuit path between ground and both output terminals 70 and 28. The voltages at terminals 28 and 70 are close to ground potential. Second transistor 20*b*, fourth transistor 20*d* and fifth and sixth transistors 30*a*, 30*b* are biased "off," whereby there is no low impedance path between circuit ground and the +V volt source.

Fifth and sixth transistors 30*a*, 30*b* are biased in a low impedance condition when the A input signal is at zero volts and the B input signal is at +V volts. Fifth transistor 30*a* provides a low impedance path between output terminal 70 and circuit ground and fifth and sixth transistors 30*a*, 30*b* provide a low impedance path between output terminal 28 and circuit ground. The voltages at both of these output terminals 28 and 70 is close to ground potential for this set of input conditions.

Assume now that both the A and B input signals are at +V volts. First and second transistors 20*a* and 20*b* are biased "on" and provide a low impedance circuit path between output terminal 28 and the +V volt source. The $\overline{\text{SUM}}$ output voltage then is closed to +V volts. The +V volts also is applied at the source electrode 74 of additional transistor 72. Since the input at the control electrode 78 is at zero volts, additional transistor 72 is biased in the full "on" condition and provides a low impedance path between junction points 44 and 48. There is thus a low impedance path between output terminal 70 and the +V volt source, whereby the output voltage at terminal 70 is close to +V volts.

As in the case of all of the circuits previously described, the FIGURE 10 circuit never has a low impedance path between circuit ground and the +V volt source in a steady state condition. For this reason, there is very little current flow in the transistors and very little power dissipation, the only current flowing in the steady state being due to leakage currents in the "off" transistors.

What is claimed is:

1. The combination comprising:

first and second transistor means of one conductivity type, each transistor means having at least one conduction path and two control electrodes;

an output terminal, and first and second terminals across which an operating potential may be applied;

means connecting the conduction paths in circuit between the output terminal and the first terminal in a manner providing first and second different circuit paths, which include the conduction paths, between said output terminal and said first terminal;

first and second ones of said control electrodes being located at different points along the length of the first circuit path;

third and fourth ones of said control electrodes being located at different points along the length of the second circuit path;

third and fourth transistor means of a second, opposite conductivity type each having at least one conduction path and two control electrodes;

means connecting the conduction paths of the third and fourth transistor means in circuit between the output terminal and the second terminal in a manner providing third and fourth different circuit paths between the output terminal and the second terminal;

fifth and sixth control electrodes being located at different points along the length of the third circuit path, and seventh and eighth control electrodes being located at different points along the length of the fourth circuit path;

means for applying each of first and second different input signals and signals representing the complements of the first and second input signals to a different one of the first, second, third and fourth control electrodes; and means for applying each of said signals to a different one of the fifth, sixth, seventh and eighth control electrodes.

2. The combination as claimed in claim 1, wherein the first and second transistor means are P-type insulated-gate field-effect transistor means, and wherein the third and fourth transistor means are N-type insulated-gate field-effect transistor means.

3. The combination as claimed in claim 2, wherein all of the field-effect transistor means are of the enhancement type.

4. The combination comprising:

first and second transistor means of one conductivity type, each transistor means having at least one conduction path and two control electrodes;

an output terminal, and first and second points of different operating potential;

means connecting the conduction paths in circuit between the output terminal and the first potential point in a manner providing first and second different circuit paths, which include the conduction paths, between said output terminal and said first potential point;

first and second ones of said control electrodes being located at different points along the length of the first circuit path;

third and fourth ones of said control electrodes being located at different points along the length of the second circuit path;

third and fourth transistor means of a second, opposite conductivity type each having at least one conduction path and two control electrodes;

means connecting the conduction paths of the third and fourth transistor means in circuit between the output terminal and the second potential point in a manner providing third and fourth circuit paths between the output terminal and the second potential point;

fifth and sixth control electrodes being located at different points along the length of the third circuit path, and seventh and eighth control electrodes being located at different points along the length of the fourth circuit path;

means for applying first signals, representing a quantity A, to one of the first and second control electrodes and to one of the fifth and sixth control electrodes;

means for applying the complements of said first signals to one of the third and fourth control electrodes and to one of the seventh and eighth electrodes;

means for applying second signals, representing a second quantity B, at the other one of the third and fourth electrodes and at the other one of the fifth and sixth electrodes; and means for applying signals representing the complements of said second signals at the other one of the first and second electrodes and at the other one of the seventh and eighth electrodes.

5. An arrangement for performing a logical operation in response to applied bivalued signals A and B and the complements $\overline{A}$ and $\overline{B}$ thereof, comprising:

four semiconductor devices of one conductivity type and four semiconductor devices of the opposite conductivity type, each device having an input and an output electrode defining a conduction path, and a control electrode;

an output terminal and first and second terminals across which an operating potential may be applied;

means connecting the conduction paths of the first and second P-type devices in series between the first terminal and the output terminal;

means connecting the conduction paths of the third and fourth P-type devices in series between said first terminal and said output terminal;

means connecting the conduction paths of the first and second N-type devices in series between the second terminal and said output terminal;

means connecting the conduction paths of the third and fourth N-type devices in series between said second terminal and said output terminal; and means for applying each of the signals A, B, $\overline{A}$ and $\overline{B}$ to a different control electrode of the four P-type devices and to a different one of the control electrodes of the four N-type devices.

6. The combination as claimed in claim 5, wherein the signals A and $\overline{B}$ are applied at the control electrodes of different ones of the first and second P-type devices, the signals B and $\overline{A}$ are applied at different ones of the third and fourth P-type devices, the signals A and B are applied at different ones of the first and second N-type devices and the signals $\overline{B}$ and $\overline{A}$ are applied at the control electrodes of different ones of the third and fourth N-type devices.

7. The combination as claimed in claim 5, wherein a point on the series path between the first and second P-type devices is directly connected to a point on the series path between the third and fourth P-type devices.

8. The combination as claimed in claim 7, including another semiconductor device having one of its input and output electrodes connected to a point on the series path between the first and second P-type devices and having the other of its input and output electrodes connected to a point on the series path betwen the first and second N-type devices, and means for applying one of the signals A, B, $\overline{A}$ and $\overline{B}$ at the control electrode of said another device.

9. The combination as claimed in claim 8, including a second output terminal electrically connected at the output terminal of said another semiconductor device.

10. The combination as claimed in claim 5, wherein a point on the series path between the first and second N-type devices is connected in common with a point on the series path between the third and fourth N-type devices.

11. The combination as claimed in claim 5, wherein a point on the series path between the first and second P-type devices is connected in common with a point on the series path between the third and fourth P-type devices, and wherein a point on the series path between the first and second N-type devices is connected in common with a point on the series path between the third and fourth N-type devices.

12. The combination as claimed in claim 5, wherein all of the semiconductor devices are insulated-gate field-effect transistors.

References Cited by the Examiner

UNITED STATES PATENTS

| | | | |
|---|---|---|---|
| 3,005,937 | 10/1961 | Wallmark et al. | 307—88.5 X |
| 3,100,838 | 8/1963 | Szekely. | |

OTHER REFERENCES

Pressman: Design of Transistorized Circuits for Digital Computers, Rider, Inc. 1959 (page 9–234).

ARTHUR GAUSS, *Primary Examiner.*

I. C. EDELL, *Assistant Examiner.*